350-163.   SR 05-18-71   XR   3,578,864

[11] 3,578,864

[72] Inventor Bernd Ross
Arcadia, Calif.
[21] Appl. No. 759,916
[22] Filed Sept. 16, 1968
[45] Patented May 18, 1971
[73] Assignee Bell & Howell Company

[54] SEMICONDUCTOR STRESS TRANSDUCER
7 Claims, 3 Drawing Figs.

[52] U.S. Cl. ........ 356/32, 331/94.5, 356/106, 350/163, 350/169, 350/174, 73/67, 73/89, 73/94

[51] Int. Cl. ........ H01s 3/00, G01b 9/02, G02b 27/00

[50] Field of Search ........ 356/32, 106; 331/94.5; 350/163, 169, 171, 174; 73/67.2, 70, 94, 89

[56] References Cited
UNITED STATES PATENTS

| | | | |
|---|---|---|---|
| 3,428,816 | 2/1969 | Jacobs et al. | 356/106X |
| 3,483,397 | 12/1969 | Miller et al. | 331/94.5 |
| 3,483,487 | 12/1969 | Nanney | 331/94.5 |
| 3,482,189 | 12/1969 | Fenner | 331/94.5X |
| 3,175,088 | 3/1965 | Herriott | 332/3X |

OTHER REFERENCES

Fenner, " Effect of Hydrostatic Pressure on the Emission from Gallium Arsenide Lasers," J. of App. Phys., Vol. 35, No. 10, Oct. 1963, pp. 2955— 7.

Meyerhofer et al., " Frequency Tuning of GaAs Laser Diode by Uniaxial Stress," Appl. Phys. Ltrs., Vol. 3, No. 10, Nov. 15, 1965, pp. 171— 2.

*Primary Examiner*—Ronald L. Wibert
*Assistant Examiner*—Paul K. Godwin
*Attorney*—Nilsson & Robbins, Wills & Berliner

ABSTRACT: A semiconductor stress transducer in which a coherent light beam from a semiconductor diode laser is photomixed with the light beam from a control semiconductor diode laser. Means are provided for detecting a difference in frequencies of the light beams. The detecting means senses optical heterodyning or homodyning of the photomixed beams and indicates the magnitude of the frequency differential as a measure of stress applied to the transducer.

PATENTED MAY 18 1971 3,578,864

INVENTOR
BERND ROSS

BY Nilsson & Robbins
ATTORNEYS

SEMICONDUCTOR STRESS TRANSDUCER

BACKGROUND OF THE INVENTION

1. Field of the Invention

The fields of art to which the invention pertains include the fields of electrical extensometers and barrier layer devices.

2. Description of the Prior Art

Injection electroluminescence results when a simiconductor PN junction is biased in the forward direction so that electrons are injected into the P side and holes into the N side. These minority carriers radiatively recombine within a diffusion length to emit light at the PN junction. A lasing structure can be provided by cleaving the ends of the semiconductor crystal so that the cleaved ends are parallel to each other and perpendicular to the PN junction. In such structures, it is theorized that an electromagnetic wave propagates along the plane of the junction from one cleaved face of the crystal to the other and along its path is amplified by the radiative recombination of injected minority carriers. In turn, these carriers are stimulated by the wave. When the wave reaches the opposite cleaved face, it is partly reflected back and then partly reflected again. If the amplitude of the wave at that point equals that of the starting wave, the threshold for lasing has been reached and laser radiation occurs.

Semiconductor materials suitable for making diode lasers are well known in the art as are techniques and methods for doping them to provide different conductivity types. Generally, the term semiconductor material is considered generic to selenium, tellurium, germanium, silicon, and germanium-silicon alloy, and compounds such as silicon carbide, indium antimonide, gallium antimonide, aluminum antimonide, indium arsenide, lead sulfide, zinc sulfide, gallium arsenide, gallium phosphide, indium phosphide, lead selenide, lead telluride, and the like. A region of semiconductor material containing an excess of donor impurities and having an excess of free electrons is considered to be an N-type region, while a P-type region is one containing an excess of acceptor impurities resulting in a deficit of electrons, or stated differently, in an excess of holes. When a continuous solid specimen of crystal semiconductor material has an N-type region adjacent to a P-type region the boundary between them is termed a PN (or NP) junction and the specimen of semiconductor material is termed a PN junction semiconductor device. Active impurities are those impurities which affect the electrical rectification characteristics of semiconductor materials as distinguished from other impurities which have no appreciable effect on these characteristics. Impurities, e.g., for gallium arsenide and the like, include sulfur, tellurium and selenium as donor impurities, and zinc, cadmium and manganese as acceptor impurities. For silicon or other group IV semiconductors, phosphorous, arsenic and antimony are donor impurities, whereas, boron, aluminum and gallium are acceptor impurities.

Injection diode lasing has been obtained with many of the foregoing materials, such as gallium arsenide, indium arsenide, indium phosphide, indium antimonide, lead selenide, gallium antimonide, lead sulfide and alloys having similar band structures, such as $GaAs_X P_{11X}$ and $InAs_X P_{11X}$, emitting light at wavelengths of from about 6300 to about 85,000 A.

Although injection diode lasing has been known for many years, the use of semiconductor material to measure applied stress has been limited to utilization of the piezoresistance effect displayed by such material rather than utilizing lasing capabilities thereof. The impact of semiconductor material on the strain gauge art has been directed toward providing more compact gauges than otherwise possible; however, the mode of operation is not essentially different in that detection of strain induced by the applied stress still requires direct electrical connection to the device.

SUMMARY OF THE INVENTION

The present invention provides a semiconductor stress transducer utilizing a mode of operation completely different from prior art stress transducers. Stress is applied to one portion of the transducer and sensed by another portion thereof that is electrically and spatially isolated from the stress bearing portion. Stress applied to a semiconductor diode laser is measured by detecting changes in the frequency of coherent light emitted thereby. The transducer comprises: a first semiconductor diode laser capable of emitting a first coherent beam of light; means for applying stress to the first diode laser; a second semiconductor diode laser capable of emitting a second coherent light beam, to act as a control for the first diode laser; and means for detecting a difference in frequencies of said light beam when the first diode laser is under applied stress. The detecting means includes means for photomixing the first and second light beams and means for sensing optical optical heterodyning or homodyning of the photomixed beams. The sensing means yields a signal in response to pulsed impingement of light thereon and means are provided to indicate the frequency of the signal to thereby quantitively indicate the applied stress.

DESCRIPTION OF THE PREFERRED EMBODIMENTS

Figure 1:
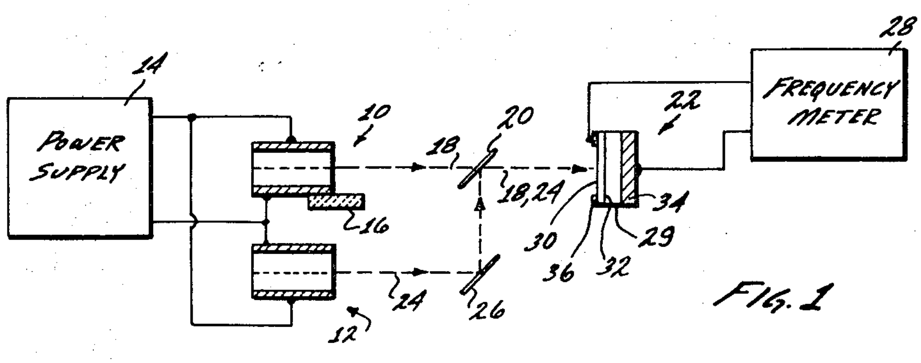
FIG. 1 is a schematic cross-sectional view of one embodiment of the invention in which coherent light beams from semiconductor diode lasers are photomixed and their frequency differential detected.

Referring to FIG. 1, an instrument embodying this invention is shown and comprises a pair of semiconductor diode lasers 10 and 12 connected in parallel to a power supply 14 therefor. One of the diode lasers 10 abuts an anvil 16 serving as a mechanical reference for stress applied to the diode laser 10. Under appropriate power conditions, a coherent light beam 18 is emitted from the mechanically referenced diode laser 10, passes through a half-silvered mirror 20, or other optical summation device and then impinges on the surface of a photodetector, in this case, a semiconductor diode sensor 22. Simultaneously, a coherent light beam 24 is emitted from the other diode laser 12, is reflected from a mirror 26 in its path to the reflective surface of the half-silvered mirror 20 and from there travels with the first-described coherent light beam 18 to be photomixed on the surface of the diode sensor 22. This arrangement results in optical heterodyning (where the unstressed diode lasers 10 and 12 emit coherent light beams of different wavelengths) or homodyning (where the unstressed diode lasers 10 and 12 emit coherent light beams of the same wavelength) of the photomixed beams 18,24 to yield optical "beats" or pulsations of light impinging on the surface of the diode sensor 22. The diode sensor 22 generates a pulsed signal in response to the heterodyning or homodyning which is magnified by a frequency meter 28, connected across the sensor 22, as known in the art, to indicate the frequency of the signal.

The diode lasers and diode sensors are constructed in accordance with well-known prior art methods. Thus, the sensor 22 can comprise a body 29 of N-type semiconductor material and a layer 30 thereon of P-type semiconductor material to form a PN junction 32 therebetween. The P-type layer 30 is very thin in comparison to the body 29 to the extent of being transparent to the light beams 18,24 so that they impinge on the PN junction 32. A metal contact plate 34 abuts the opposite side of the N-type body 29 and is connected to the frequency meter. An annular contact ring 36 abuts the outer edge of the P-type layer 30 and is also connected to the frequency meter.

The frequency meter 28 can be any of a variety of well-known devices for indicating the number of voltage bursts generated from the diode sensor 22. The voltage bursts are directly proportional to the optical "beats" or pulsations resulting from heterodyning or homodyning of the photomixed light beams 18,24. The number of such "beats" depends on the frequency differential between the light beams 18 and 24 and, past a threshold, are substantially independent of the power supply. Accordingly, the signal frequency indicated by the frequency meter is also independent, past the threshold values, of the power supply, thereby eliminating a cause of error present with prior art piezoresistance devices. The magnitude of the reading given by the frequency meter is directly related to, and can be calibrated to directly indicate, uniaxial strain applied to the mechanically referenced diode laser 10.

Figure 2:
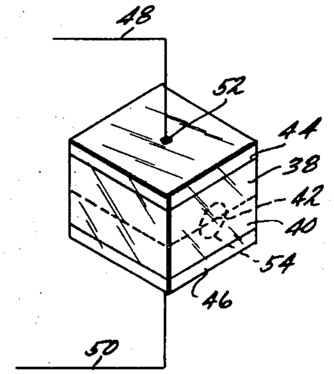
FIG. 2 is an enlargement in schematic perspective view of one of the semiconductor diode lasers of FIG. 1.

Referring to FIG. 2, a schematic perspective view of the diode laser 10 or 12 is shown and comprises a layer 38 of N-type semiconductor material integral with a layer 40 of P-type semiconductor material to form a PN junction 42 therebetween. The layers 38 and 40 are sandwiched between metal contact plates 44 and 46 with leads 48 and 50, respectively, soldered thereto, e.g., at 52. The diode can be overcoated (not shown) with an opaque material leaving an opening indicated by the dashed lines 54. When sufficient voltage is impressed across the plates 44 and 46, coherent light is emitted from the PN junction 42 at the opening 54. The wavelength of the light can be selected by appropriate selection of a composition of the layers 38 and 40. Diode lasers of the type utilized herein are well-known to the art and their composition and methods of fabrication are not a part of this invention. For example, N-type semiconductor material such as GaAs is degenerately doped by known diffusion or epitaxial deposition techniques with a P-type dopant such as cadmium, and/or zinc. The preparation of such diodes by solution growth epitaxy is described in detail in "High-Power Pulsed GaAs Laser Diodes Operating at Room Temperature" by Herbert Nelson, Proceedings of the IEEE, Volume 55, p. 1415—1419 (1967). The preparation of diffused diodes is described by R. O. Carlson in "Improved Room Temperature Laser Performance in GaAs Diffused-Junction Diodes" Journal of Applied Physics, Volume 36, p. 661—668 (1967), incorporated herein by reference. The output wavelength of these laser diodes at room temperature is in the infrared region of the electromagnetic spectrum at approximately 9200 A. Different wavelengths may be obtained by choosing other III—V groups compounds as starting materials. Visible light laser diodes may be fabricated from alloys of the above compounds such as gallium-arsenide-phosphide. The construction and some properties of such diodes may be found in: "Gallium-Arsenide-Phosphide: Crystal Diffusion and Laser Properties" by C. J. Nuese, et al., Solid-State Electronics, Volume 9, p. 735—749 (1966). In FIG. 7 of that article, the photon energy of the emission peak $GaAs_{1x}P_x$ junction diodes is given as a function of mole fractions GaP. Photon energy is, of course, related to wavelength by the formula $E_{(eV)}=1.24\times10^4/\lambda(A)$. Accordingly the composition of the $GaAs_{11x}P_x$ can be chosen se as to yield an emission energy of desired level.

In a typical example of a solution grown diode, 800 mg. of GaAs and 67 mg. of tellurium as N-type dopant, are dissolved in 7.1 grams of Ga in an inert atmosphere at 920°C. When all the source gallium arsenide is dissolved, the solution is tipped onto a polished P-type GaAs substrate containing approximately $1.7\times10^{19}$ Zn atoms/cm.$^3$. The solution is now allowed to cool, preferably from substrate up, such that a continuous epitaxial crystal layer is formed on the substrate, doped with Ie atoms. The cooling time from 916° C to 850° C is typically 30 minutes. The NP junction is formed approximately at the epitaxial layer-to-substrate interface. The laser diode is completed by sawing to size, cleaving reflecting surfaces and applying the contact plates 44 and 46 to the electrode surfaces. The contact plates 44 and 46 can be gold metal and alloyed with heat to the respective layer. As exemplary of operation, room temperature lasing will occur in an epitaxial solution grown diode of about 0.005 inches ×0.010 inches area when a forward current of 20 amperes is applied under a bias of about 1.5 volts to yield a coherent light beam of about 9200 A. wavelength.

Both laser diodes 10 and 12 can be the same or different; when they are the same, photomixing of the beams 18 and 24 results in heterodyning only when stress is applied uniaxially to one of the diode lasers 10, but not to the other. The result of applying stress is to change the wavelength of the coherent light emitted therefrom. While under most practical conditions of use, the wavelength changes are in the order of about 20 A, such differences can be readily detected by the heterodyning technique utilized. The effect of uniaxial stress on the frequency of light emitted from diode lasers is described in an article entitled "Frequency Tuning of GaAs Laser Diode by Uniaxial Stress," by Meyerhofer and Braunstein, Applied Physics Letters, Volume 3, No. 10 Nov. 15, 1963), incorporated herein by reference.

Where the two diode lasers 10 and 12 are different, so as to yield light beams of different wavelengths, then a mechanical reference can be omitted. A differential in wavelength in proportion to applied stress will be obtained since the different diodes will respond with different magnitudes of frequency change. Similarly, where the two diode lasers 10 and 12 yield the same wavelength of light, but the diodes are of different composition (e.g., containing different levels or nature of impurities, but designed to yield the same wavelengths) and respond differently to applied stress, then both diodes can be subjected to the same uniaxial stress conditions and still yield a frequency differential in proportion to magnitude of the applied stress.

Figure 3:
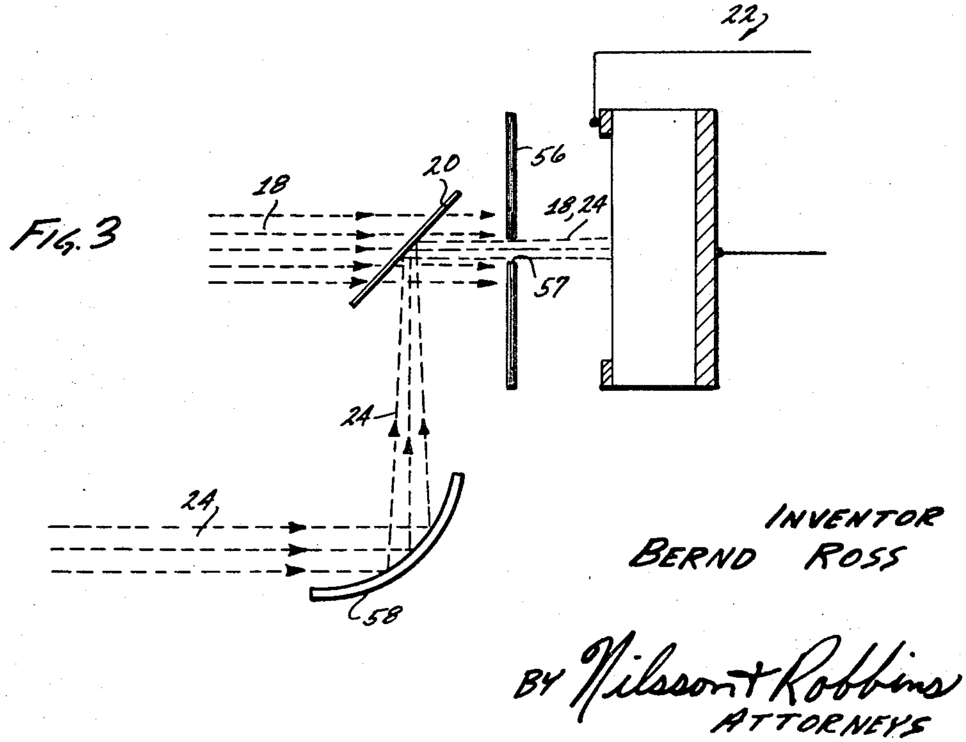
FIG. 3 is a schematic cross-sectional view of an arrangement of components for photomixing in another embodiment of the invention.

The spatial requirements for photomixing are quite severe and for weak signals the simple arrangement illustrated in FIG. 1 may not be satisfactory. In such case, an arrangement as illustrated in FIG. 3 can be utilized. Referring to FIG. 3, a light beam 18 from the mechanically referenced diode laser 10 is passed through a half-silvered mirror 20, as in FIG. 1, but from there impinges upon a shutter 56 with an aperture 57 therein which allows only a small central portion of the light through to impinge on the surface of the diode sensor 22. The light beam 24 from the other diode laser 12 is reflected from a concave diffraction-limited mirror 58 to the reflecting side of the half-silvered mirror 20 to be reflected therefrom in reduced diameter through the shutter aperture 57 to photomix with the other light beam 18 on the surface of the diode sensor 22. This arrangement results in a larger signal-to-noise ratio than obtained with the arrangement of FIG. 1. An appropriate aperture diameter, and other spatial dimensions, can be calculated by methods known to the art. In this regard, see "Laser Receivers" by Monte Ross, John Wiley & Sons, Inc. (1966), incorporated herein by reference, which describes the foregoing heterodyning and homodyning techniques in detail. Adjustment and positioning screws and brackets (not shown) are provided on the device (and, similarly, on the device of FIG. 1) to allow adjustment to very small tolerances.

I claim:

1. A semiconductor stress transducer, comprising:
   - a first semiconductor diode laser for emitting a first coherent light beam;
   - means for applying stress to said first diode laser;
   - a second semiconductor diode laser for emitting a second coherent light beam;
   - means for combining said first and second beams; and
   - means for detecting a difference in frequencies of said light beams when said first diode laser is under said applied stress.

2. The transducer of claim 1, wherein said detecting means includes means for photomixing said first and second light beams and means for sensing optical heterodyning or homodyning of said photomixed beams.

3. The transducer of claim 1 wherein the wavelengths of said first and second light beams are substantially the same in the absence of applied stre: s on said first diode laser.

4. The transducer of claim 1, wherein said second diode laser is disposed proximate to said first diode laser.

5. The transducer of claim 1, wherein said detecting means is responsive to said difference in frequencies of said light beams to indicate the magnitude of said difference.

6. The transducer of claim 1, wherein said detecting means comprises:

a semiconductor diode sensor that yields a signal in response to pulsed impingement of light thereon; and means to indicate the magnitude of said signal.

7. The transducer of claim 1, wherein said sensing means comprises:

means for photomixing said first and second light beams;

means for generating a signal in response to impingement of heterodyne or homodyne light pulses of said photomixed beams; and means indicating the magnitude of said signal.